United States Patent Office 2,877,167
Patented Mar. 10, 1959

2,877,167

HYDROPHILIC CYANIDE OF PARA-AMINO TRIPHENYLMETHANE DYES

Lyman Chalkley, Prince Georges County, Md.

No Drawing. Application June 19, 1957
Serial No. 666,778

9 Claims. (Cl. 204—158)

The present invention relates to hydrophilic cyanides of p-amino triphenylmethane dyes and particularly to such a cyanide which has only one sulfonic acid group in the molecule.

It has long been known that certain of the triphenylmethane dyes which contain at least one amino group para to the central methane carbon atom form colorless cyanides which in the presence of suitable organic activators become photosensitive to ultraviolet and shorter wave lengths of light to produce colored compounds but which are not sensitive to light in the visible range. Because of this property, the substances may be used in solution and absorbed or coated on a suitable base in the presence of an activator for the recording and measurement of ultraviolet radiation. Expensive equipment, such as quartz spectrographs and photoelectric meters, is ordinarily used to isolate this region.

Papers prepared from one of the photosensitive compounds and an activator therefor may be used in photographic and photoduplication processes to print out images that are fully formed without development, that may be permanent and that may be examined in ordinary interior illumination without fixing. The papers employed retain their ultraviolet sensitivity after the printing of one image so that other portions may be printed on at a later date.

However, all of the known p-amino triphenylmethane dye cyanides have been hydrophobic in nature and are not activated by water so as to provide useful systems photosensitive to ultraviolet.

I have found that new compounds which comprise p-amino triphenylmethane dye cyanides having in the molecule at least one hydrophilic group, such as the sulfonic acid, quarternary ammonium or hydroxyl group, are hydrophilic in character and that the potential sensitivity to ultraviolet radiation possessed by the known hydrophobic dye cyanides is not lost in the new compounds. In fact, unlike the previous hydrophobic p-amino triphenylacetonitriles, the new compounds are activated by water alone. They are also excellent sensitizers for hydrocolloids. It will be understood, of course, that more than one type of hydrophilic group may be present in the same molecule of dye cyanide. The p-amino groups may be primary, secondary, or tertiary, in nature.

It will be noted that the sulfonic acid group used to produce the hydrophilic dye cyanides of the present invention is itself a highly ionized salt-forming radical. The essential part of the dye cyanide containing this group comprises the ion, $RSO_3^-$. This ion, because of its strongly hydrophilic character, confers the desired hydrophilic properties upon the triphenylacetonitrile. However, the ion alone, of course, does not constitute a complete neutral molecule and, therefore, the sulfonic ion is always combined with an ion of opposite charge in a complete molecule. Thus, the sulfonic ion is combined with a cation, which may be hydrogen or a metallic ion or ammonium.

The nature of the cation with which the sulfonic ion is combined is not at all critical. In aqueous solution in which these triphenylacetonitriles are photosensitive, the sulfonic acid group is largely ionized and the cation is no longer even a part of the molecule. Therefore, any cation may be used with the sulfonic acid group to prepare a satisfactory hydrophilic dye cyanide.

For matters of convenience, selected cations are combined with the sulfonic acid ion. Thus, the salts of the sulfonic acids are generally quite soluble in water. In order to obtain compounds which crystallize well, certain cations such as sodium, potassium, calcium, strontium, and barium, have been utilized especially.

It is the object of the present invention to provide new p-amino triphenylacetonitriles which are hydrophilic and are activated by water to form colored compounds on exposure to ultraviolet and shorter wave lengths.

Another object of the invention is to provide a hydrophilic p-amino triphenylmethane dye cyanide which is soluble in water to a substantial degree.

Still another object of the invention is to provide a hydrophilic p-amino triphenylmethane dye cyanide which is a good sensitizer for hydrocolloids to furnish material on which there can be printed by ultraviolet irradiation, images of strong intense green color and clean whites, which may be fixed very completely and easily.

A further object of the invention is to provide a p-amino triphenylmethane dye cyanide which in the presence of an activator colors very rapidly on exposure to ultraviolet especially to 3132 A. such as is furnished by a strong mercury vapor lamp.

Yet another object of the invention is to provide a process for preparing the present dye cyanide.

Another and further object of the invention is to provide a photochemical process employing the present new compounds.

The hydrophilic dye cyanide of the present invention has the general formula

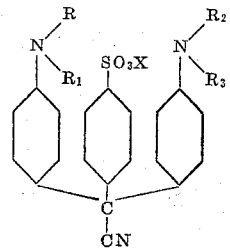

where R, $R_1$, $R_2$ and $R_3$ are methyl or ethyl groups and X is a cation.

The position of the sulfonic acid group in the molecule is important in order to obtain the desirable properties of a hydrophilic dye cyanide that has a practicable water solubility, with spectral sensitivity limited to short wave ultraviolet and that yields on photolysis an intense green color. With the sulphonic acid group in the ortho position the spectral sensitivity is changed, the color produced on photolysis is blue instead of green, and the solubilities are reduced. Also if the sulfonic acid group is placed on one of the phenyl groups carrying an amino group, spectral sensitivity, color of image, and/or solubility may be adversely influenced.

As a specific example of such a compound may be mentioned the cyanide of Helvetia Green, Colour Index No. 660, which should be understood to include both the free sulfonic acid and salts thereof.

It has been found that Helvetia Green cyanide may be prepared by directly sulfonating the compound 4,4'-bis-dimethyl amino triphenylacetonitrile. This is not to be expected since, as is well known, treatment of a nitrile with strong acid ordinarily results in hydrolysis of the cyano group.

Any of the usual strong sulfonating agents may be employed, such as fuming sulfuric acid or chlorosulfonic acid. The following example shows the preparation of Helvetia Green cyanide in this manner:

*Helvetia Green cyanide*

To 35 g. of chlorosulfonic acid is added slowly with stirring at room temperature 10 g. of powdered 4,4'-bis-dimethylamino triphenylacetonitrile. The resulting clear solution is heated slowly in a 250 ml. flask to 85° C. and held at that temperature until the vigorous evolution of gas (hydrogen chloride) subsides. The solution is then heated to 100° C. for 10 minutes, cooled, poured onto 180 g. of cracked ice, the resulting solution filtered and the filtrate treated with a solution of 40 g. of sodium hydroxide in 750 ml. of water. The resulting mixture is allowed to stand at 15° C. for 24 hours and the precipitate collected on a filter and air-dried. The yield is about 12 g. of the sodium salt of Helvetia Green cyanide, having the formula

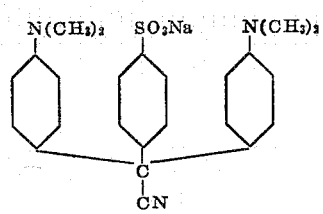

It is pure enough for many uses, but may be further purified by recrystallization from 1% aqueous sodium chloride solution.

The free acid, having the formula

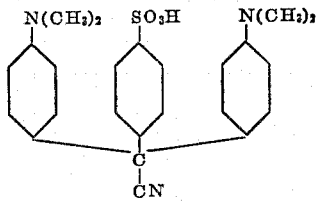

may be obtained by treatment of a 5% aqueous solution of the sodium salt at 50° C. with one equivalent of hydrochloride acid per molecule of sodium salt. The resulting mixture is allowed to cool and to stand at room temperature for 24 hours, when the acid is collected on a filter and dried. The proper ratio of acid to sodium salt, as stated above, should be used because the free acid form of the dye cyanide is more soluble both in excess acid and in alkali.

Upon irradiation with ultraviolet in the presence of an activator, Helvetia Green cyanide very rapidly yields an intense green color. In slightly alkaline solution this color fades in the dark, i. e., it is phototropic.

It is an excellent sensitizer for hydrocolloids and has the advantageous property that it can readily be coated onto reproduction papers without striking through. This is difficult to do with photosensitive systems employing malachite green cyanide, which on photolysis yields the most similar color, because the photoactivators for malachite green cyanide are alcoholic or oily compounds that diffuse through even well sized reproduction paper stocks.

Similarly Brilliant Green cyanide can be directly sulfonated to the corresponding hydrophilic dye cyanide having the constitution:

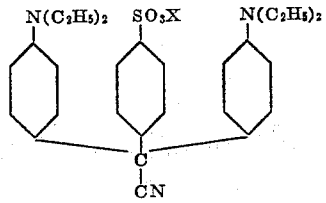

This also yields a green color on photolysis.

This application is a continuation-in-part of my co-pending application S. N. 550,773, filed December 2, 1955, now abandoned.

I claim:
1. The hydrophilic dye cyanide having the formula

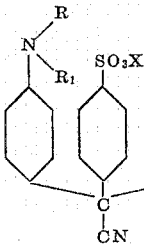

where R, $R_1$, $R_2$ and $R_3$ are alkyl groups selected from the group consisting of methyl and ethyl groups and X is a cation.

2. The hydrophilic dye cyanide having the formula

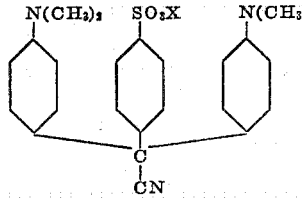

where X is a cation.

3. The hydrophilic dye cyanide having the formula

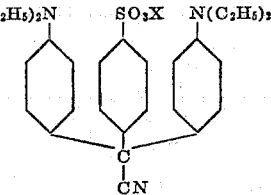

where X is a cation.

4. A process for forming a colored compound comprising irradiating with ultraviolet light in the presence of an activator consisting of water, a hydrophilic dye cyanide having the formula

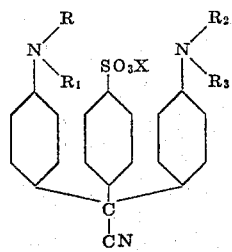

where R, $R_1$, $R_2$ and $R_3$ are alkyl groups selected from the group consisting of methyl and ethyl groups and X is a cation.

5. A process for forming a colored compound comprising irradiating wtih ultraviolet light in the presence of an activator consisting of water, a hydrophilic dye cyanide having the formula

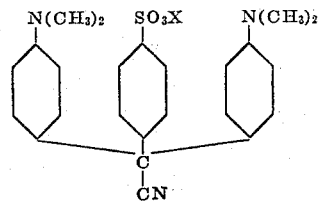

where X is a cation.

6. A process for forming a colored compound comprising irradiating with ultraviolet light in the presence of an activator consisting of water, a hydrophilic dye cyanide having the formula

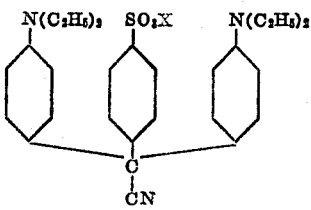

where X is a cation.

7. The process of preparing a hydrophilic dye cyanide having the formula

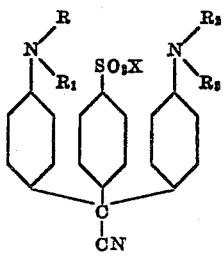

where R, $R_1$, $R_2$ and $R_3$ are alkyl groups selected from the group consisting of methyl and ethyl groups and X is a cation, which process comprises reacting a p-amino triphenylmethane dye cyanide having the formula

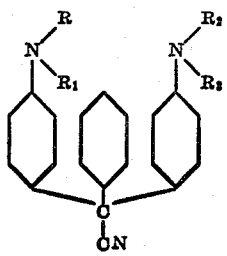

where R, $R_1$, $R_2$ and $R_3$ have the above meaning, with a strong sulfonating agent and separating said hydrophilic dye cyanide from the reaction mixture.

8. The process of preparing the cyanide of Helvetia Green, Colour Index No. 660, which comprises reacting 4,4'-bis-dimethyl amino triphenylacetonitrile with a strong sulfonating agent and separating said Helvetia Green cyanide from the reaction mixture.

9. The process of preparing the hydrophilic dye cyanide having the formula

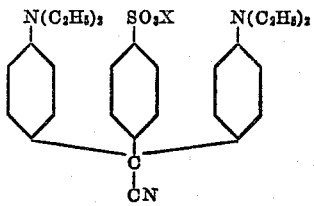

where X is a cation, which comprises reacting 4,4'-bis-diethyl amino triphenylacetonitrile with a strong sulfonating agent and separating said hydrophilic dye cyanide from the reaction mixture.

References Cited in the file of this patent
UNITED STATES PATENTS

| | | |
|---|---|---|
| 2,150,695 | Muehler | Mar. 14, 1939 |
| 2,325,038 | Chalkley | July 27, 1943 |
| 2,441,561 | Chalkley | May 18, 1948 |
| 2,469,682 | Dickey | May 10, 1949 |
| 2,732,337 | Togel | Jan. 24, 1956 |
| 2,734,027 | Nickerson | Feb. 7, 1956 |